3,340,500
SYSTEM WITH ELECTRICAL UTILIZATION DEVICE HAVING MAIN ENERGIZATION CONDUCTORS OVER WHICH INFORMATION SIGNALS ARE ALSO TRANSFERRED

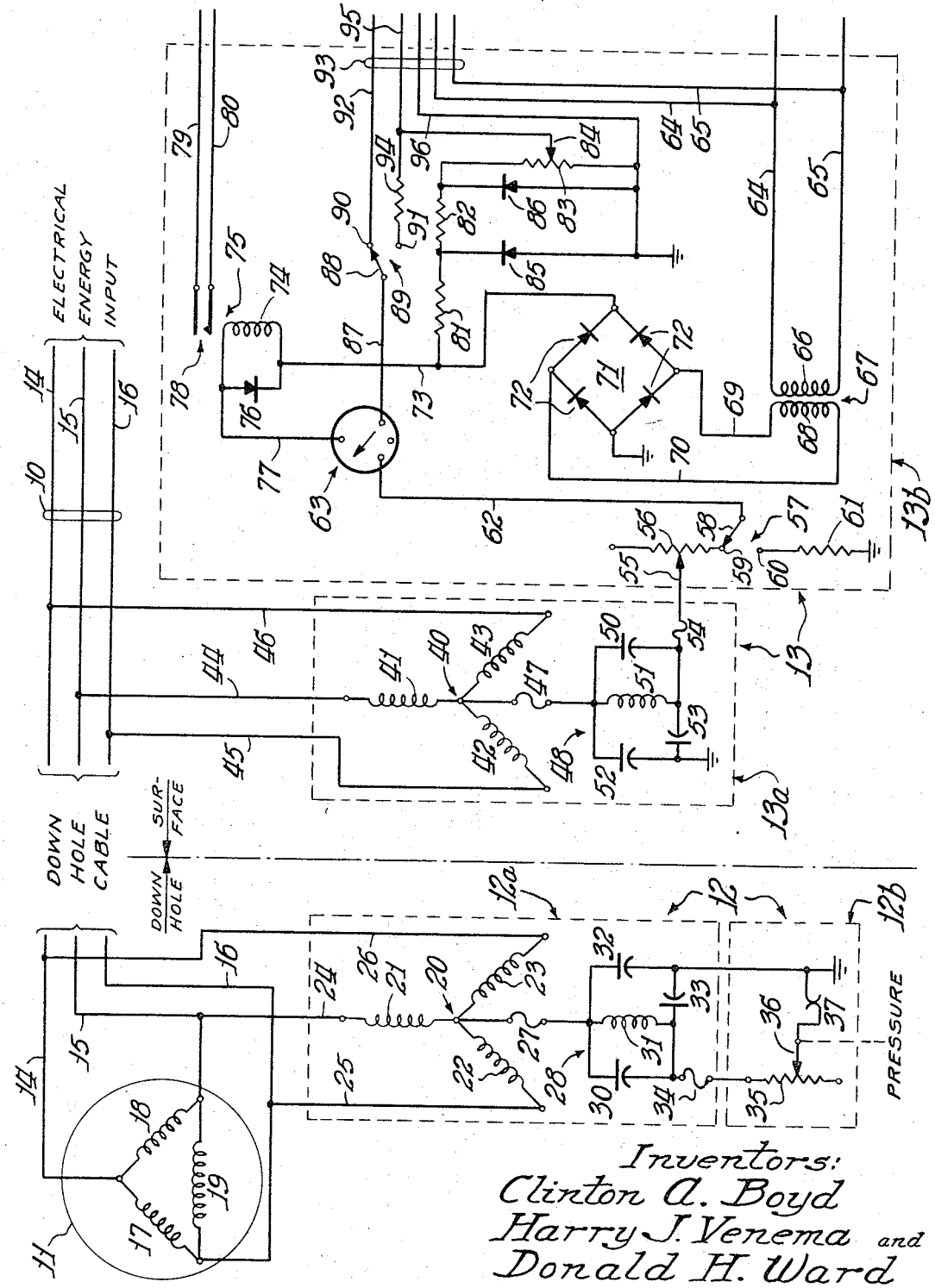

Clinton A. Boyd, Tulsa, Okla., and Harry J. Venema, Wheaton, and Donald H. Ward, Glen Ellyn, Ill., assignors to Borg-Warner Corporation, Chicago, Ill., a corporation of Illinois
Filed Oct. 8, 1964, Ser. No. 402,391
6 Claims. (Cl. 340—18)

The present invention is directed to a system for translating both electrical energy and information represented by a varying electrical signal between a surface location at the top of a deep well or shaft over a cable to the bottom of such a shaft, and more particularly to such a system in which the same electrical conductors in the cable are utilized both for the energy transfer and the information transfer.

When a bore hole for oil is drilled, although the hole is of relatively small diameter, it may extend for thousands of feet below the surface of the earth. To energize electrical equipment such as drilling equipment, and after the hole is finished to energize pumping equipment run by an electric motor, energy is passed over a plurality of electrical conductors bound in the down hole cable to the motor at the bottom of the hole. It is generally desirable to monitor the operation of such equipment by noting variations in physical conditions at the bottom of the hole. For example, a transducer may be positioned at the bottom of the hole to sense variations in fluid pressure to provide information related to the type and amount of fluid at the down hole location. The placement of additional conductors to translate electrical signals denoting the pressure variations is difficult within the confines of the relatively small hole, and increases the expense of installation and operation. Previous attempts to pass information over the same electrical conductors which are utilized to energize the motor in the down hole location have not met with the desired measure of success.

It is, therefore, a primary object of the present invention to provide a combined energy transfer and information translation system in which only a single down hole cable is used to energize the motor at the down hole location and to return signals denoting pressure variations or other information to the surface location.

It is a more specific object of the present invention to provide such a system which minimizes degradation of the electrical signal by avoiding shunting of the sensing arrangement by the motor windings and by avoiding shunting of the indicating arrangement by the power input arrangement.

The foregoing and other objects of the invention are attained, in one embodiment, by providing a down hole assembly for positioning at the down hole location. This assembly includes a first impedance means which is coupled to the conductors in the down hole cable, and further includes sensing means coupled between a reference point in the impedance means and a plane of reference potential, conventionally designated ground. The coupling of the sensing means between one point on the impedance means and ground, rather than across one phase of the motor or across a corresponding portion of the impedance means, avoids the shunting of the sensing means by the motor winding and consequent degradation of the electrical information-denoting signal. In addition, a surface assembly is positioned at the surface location adjacent the hole. This surface assembly includes a second impedance means which is also coupled to the electrical conductors of the down hole cable, and additionally comprises indicating means coupled between ground and a reference point in the second impedance means analogous or corresponding to the reference point in the first impedance means. With this arrangement pressure variations or other changes, such as temperature variations, are converted into electrical signal variations in the sensing means, passed through the first impedance means and over the down hole cable to the second impedance means, where the indicating means responds to the signal variations and provides a visible indication of pressure or other variations at the bottom of the shaft or hole.

To enable those skilled in the art to make and use the invention, it will be described in connection with the single figure of the accompanying drawing, which figure is a schematic diagram depicting a preferred embodiment of the present invention and its intercoupling with a down hole cable which passes electrical energy to the motor at the bottom of the hole.

Structure of the invention

As shown in the drawing, a cable 10 is provided to pass electrical energy to a motor 11 at the down hole location. In accordance with the inventive teaching a down hole assembly 12 is provided at the bottom of the hole, to sense variations in a given variable such as pressure and provide related variations in an electrical signal. Down hole assembly 12 includes an impedance sub-assembly 12a and a sensing sub-assembly 12b. At the top of the hole a surface assembly 13 is located, and assembly 13 comprises an impedance or inductor assembly 13a and an indicating assembly 13b. At the surface location the electrical signal variations pass from cable 10 through inductor assembly 13a into indicating assembly 13b where they are converted into a visible indication. The sensing and indicating circuit is completed by the ground connections at the down hole and surface locations, which connections represent the earth itself in this arrangement. It is noted that although cable 10 is shown with three separate conductors 14, 15 and 16, the invention could be used with a single phase motor and a down hole cable having only a pair of conductors for passing electrical energy to the motor.

Considering first the equipment positioned at the down hole location, depicted in the left-hand portion of the drawing, motor 11 is there shown with three separate windings 17, 18 and 19 connected in a delta arrangement. Both the motor and the energizing conductors 14, 15 and 16 are conventional components of a down hole system in which drilling or pumping apparatus is energized from an electrical motor.

In accordance with the inventive teaching, an impedance means or network 20 is provided at the down hole location, and comprises three balanced inductors 21, 22 and 23, connected together in a star or Y configuration. Inductor or winding 21 is coupled over conductor 24 to the junction of motor windings 18 and 19; inductor 22 is coupled over conductor 25 to the junction of motor windings 17 and 19; and inductor 23 is coupled over conductor 26 to the junction of motor windings 17 and 18. It is noted that the Y configuration 20 of the balanced inductors could also be coupled to the motor if the motor windings were connected in a Y or star configuration, and the teachings of the present invention are applicable no matter the particular arrangement of the motor windings.

In the illustrated embodiment the mid-point or neutral connection of balanced inductors 21–23 is considered a reference point to which the sensing arrangement is connected. In more detail, the neutral or center point of Y-connected inductors 21–23 is coupled over a fuse 27 to a protective net work 28. The parallel-connected arrangement of capacitor 30 and inductor 31, one end of which is coupled with fuse 27, is electrically sized to resonate at 60 cycles per second (cps) to thus provide a very high impedance to stray alternating electrical energy passed from the motor windings to the components within inductor sub-assembly 12a. Any stray alternating energy that is not blocked by the parallel combination 30, 31 is effectively shunted to ground through the capacitors 32 and 33, connected from opposite ends of inductor 31 to a plane of reference potential, represented by the conventional ground symbol. Another fuse 34 has one end connected to the common connection of inductor 31 and capacitors 30 and 33.

Sensing sub-assembly 12b comprises a potentiometer 35 with a movable arm 36, the exact position of the arm being adjusted responsive to the pressure sensed at the down hole location. One end of potentiometer 35 is coupled to fuse 34, and movable arm 36 is coupled through a bi-metallic contact set 37 to ground. Contact set 37 is heat responsive, being set to open at the maximum heat rating of the insulation on the motor windings.

Considering now the impedance sub-assembly 13a of the complete surface assembly 13, another balanced inductor network 40 is provided at the surface location. This impedance network comprises three balanced inductors 41, 42 and 43, connected over conductors 44, 45 and 46 to the individual conductors 15, 16 and 14, respectively, in the down hole cable. It is noted that this arrangement of the balanced inductors and the connection to the individual conductors of the down hole cable is in all respects symmetrical with and corresponding to the arrangement and connection in the impedance sub-assembly 12a at the down hole location.

The reference point, in this case the neutral connection, of impedance network 40 is coupled over a fuse 47 to a protective network 48 which includes the parallel-coupled combination of a capacitor 50 and inductor 51, tuned to resonate at 60 c.p.s. and thus block alternating energy which might be passed into the inductor sub-assembly 13a from the down hole cable. Any stray alternating energy not blocked by the combination of 50, 51 is shunted to ground through the relatively low impedance presented by capacitors 52 and 53, coupled from the opposite end portions of inductor 51 to the plane of reference potential or ground. The junction of inductor 51 and capacitors 50 and 53 is coupled through a fuse 54 to the input portion of indicating sub-assembly 13b.

Fuse 54 is coupled to the adjustable arm 55 of a potentiometer 56, with the positioning of arm 55 being utilized to regulate the total resistance in the combined system. Accordingly, variations in the length of the down hole cable can be accommodated by the setting of potentiometer 56. A switch 57 is provided with a movable contact 58, shown engaging fixed contact 59 and displaceable to engage another fixed contact 60. A fixed resistor 61 is coupled between contact 60 and ground. The illustrated position of switch 57 is the "read" position in which unidirectional current is passed over contact 58 and conductor 62 to meter 63, to provide a visible indication of pressure variations at the down hole location. In the alternate position of switch 57, with contact 58 engaging fixed contact 60, a standard resistance value provided by resistor 61 is utilized to effect a zero setting on meter 63.

Electrical power for energizing the indicating and sensing arrangement is received over conductors 64 and 65, which may be coupled to a conventional alternating energy power main which supplies electrical energy alternating at a frequency of 60 c.p.s. at a level of approximately 110 volts. Conductors 64, 65 are coupled to the primary winding 66 of a transformer 67, which includes a secondary winding 68. This transformer may be of the well known filament type, used to step down the input voltage from 110 volts to 12.6 volts.

The opposite end portions of secondary winding 68 are coupled over conductors 69, 70 to the input connections of a conventional rectifier bridge 71, shown comprised of four diodes 72. One output terminal of rectifier bridge 71 is connected directly to ground, and the other output terminal is coupled over a conductor 73, the parallel connection of winding 74 of relay 75 and a protective diode 76, and conductor 77 to meter 63. Upon flow of current beyond a predetermined level through winding 74, relay 75 operates to close contact set 78 and effectively connected together conductors 79 and 80.

Conductor 73 is also coupled through the series-connected resistors 81 and 82 to one end of potentiometer 83, the other end of which is connected to ground. Potentiometer 83 includes a movable arm 84. A first Zener diode 85 is connected between ground and the junction of resistors 81 and 82, and a second Zener diode 86 is connected between ground and the junction of resistor 82 and potentiometer 83.

Another connection from meter 63 is effected over conductor 87 which is coupled to the movable contact 88 of a selector switch 89, having first and second fixed contacts 90 and 91. Fixed contact 90 is coupled to conductor 92 of a cable 93, and fixed contact 91 is coupled through a resistor 94 to another conductor 95 of cable 93. A ground conductor 96 is also provided in the same cable. This cable thus includes five conductors, conductors 64 and 65 for providing alternating energy, ground reference conductor 96, and a standard signal input over conductor 95 or a varying signal input over conductor 92 for translation to a recording meter when it is desired to make a permanent record of the condition variations at the down hole location. Conductors 79, 80 can be separately connected to a visual indicating means such as a pilot light, to an alarm, or can be utilized to operate a circuit breaker to interrupt energy transfer over conductors 14–16 to motor 11 when opening of contacts 37 in the down hole pressure sensing sub-assembly 12b indicates that the motor has overheated.

*Operation of the invention*

Prior to operation of the system, the indicating arrangement 13b is energized by supplying alternating input energy over conductors 64, 65. Movable contact 58 of switch 57 is displaced downwardly to engage contact 60, and movable arm 84 of potentiometer 83 is adjusted to provide a zero indication on meter 63. Movable contact 58 is then displaced upwardly to engage contact 59. Variations in pressure at the down hole location effect related changes in the position of arm 36 of potentiometer 35, thus changing the total direct current (DC) resistance between ground and fuse 34. This DC resistance change varies the total DC resistance in the circuit extending from ground through sensing sub-assembly 12b, inductor sub-assembly 12a at the down hole location, the length of the down hole cable, inductor assembly 13a at the surface location, and over indicating sub-assembly 13b at the surface location to ground. This variation in total DC resistance is reflected as a change in the level of current flow through milliammeter 63, thereby providing a visible indication of the pressure variation at the down hole location. In the event the motor should overheat and the temperature sensed by bi-metallic contact set 37 increases beyond the maximum insulation rating, contact set 37 is opened and the consequent increased current flow through meter 63 and winding 74 of relay 75 effects the operation of contact set 78 to provide an indication of the dangerous condition at the down hole location.

It is emphasized that both the sensing and the indicating sub-assemblies are coupled to a similar reference point on their respective inductor sub-assembly. Although in the illustrated embodiment, which presently is considered the preferred embodiment for practicing the invention, the sensing and indicating sub-assemblies are coupled to the neutral point of the Y-connected inductors, such connection could also be made at the extremity of one inductor, for example, fuse 27 in sub-assembly 12a could be coupled to the junction of conductor 26 and inductor 23. To maintain the analogy in the overall circuit, fuse 47 in sub-assembly 13a would then be coupled to the junction of conductor 46 and inductor 43. In a related manner, the connection could be made at an intermediate point on both inductors 23 and 43, so long as the connection is analogous or similar in all respects at both the down hole and the surface locations.

With this arrangement an effective information transfer system has been provided for surface indicating equipment without unduly increasing the physical size of the down hole package and without necessitating a complex arrangement at the surface. The interposition of the impedance networks, both at the down hole location and at the surface, avoids the shunting of the sensing unit by the motor windings at the down hole location and further avoids shunting of the indicating equipment by the power lines at the surface. It appears that this utilization of the impedance means or networks substantially enhances the effectiveness of the inventive arrangement.

To assist others in practicing the invention, a table of circuit values and identities is set out below. It is emphasized, however, that such table is given by way of illustration only and in no sense by way of limitation.

| | | Identification or value |
|---|---|---|
| Diodes: | | |
| 76 | | 1N91 |
| 85 | | 1N756A |
| 86 | | 1N754A |
| Potentiometers: | | |
| 56 | ohms | 0–500 |
| 83 | do | 0–5,000 |
| Resistors: | | |
| 61 | do | 1,500 |
| 81 | do | 1,000 |
| 82 | do | 100 |
| 94 | do | 100 |
| Inductors: | | |
| 31 | henries | 10 |
| 51 | do | 10 |
| Capacitors: | | |
| 30 | microfarads | 0.68 |
| 32 | do | 25 |
| 33 | do | 25 |
| 50 | do | 0.68 |
| 52 | do | 25 |
| 53 | do | 25 |
| Fuses: | | |
| 27 | ampere | 1 |
| 34 | milliamperes | 31 |
| 47 | amperes | 1 |
| 54 | milliamperes | 31 |
| Meter: | | |
| 63 | milliammeters | 0–1 |

In addition, diodes 72 may be of any suitable type. The balanced inductor legs 21–23 and 41–43 should be wound to present an inductive reactance high relative to the reactance of the motor windings under load and maintaining the DC resistance of the legs sufficiently small with respect to the DC resistance of the transducer to ensure effective translation of the pressure variations.

Although only a particular embodiment of the invention has been described and illustrated, it is apparent that modification and alterations may be made therein. It is therefore the intention in the appended claims to cover all such modifications and alterations as may fall within the true spirit and scope of the invention.

What is claimed is:
1. For use with a system in which electrical energy is passed from a surface location to a down hole location over a cable including a plurality of conductors to energize equipment at the down hole location, the combination comprising:

a down hole assembly positioned at the down hole location, including a first impedance sub-assembly comprising a first balanced inductor network coupled to the conductors, and a sensing sub-assembly including a transducer coupled between a reference point in the first inductor network and a plane of reference potential; and a surface assembly positioned at the surface location, including a second impedance sub-assembly comprising a second balanced inductor network coupled to the conductors, the inductors in the second network being disposed and connected in a configuration identical to that of the inductors in the first network, and an indicating sub-assembly coupled between the plane of reference potential and a reference point in the second inductor network, the second reference point being located in the same relative position as the reference point of the first inductor network, to insure that variations in the condition sensed by the transducer are translated as electrical signal variations to the indicating sub-assembly at the surface location.

2. For use with a system in which electrical energy is passed from a surface location to a down hole location over a cable including a plurality of conductors to energize equipment at the down hole location, the combination comprising:

a down hole assembly positioned at the down hole location, including a first balanced inductor network coupled to the conductors, a transducer coupled to a reference point in the first inductor network, and a heat sensing contact set coupled between the transducer and a plane of reference potential; and a surface assembly positioned at the surface location, including a second balanced inductor network coupled to the conductors, the inductors in the second network being disposed and connected in a configuration identical to that of the inductors in the first network, and an indicating sub-assembly coupled between the plane of reference potential and a reference point in the second inductor network, the second reference point being located in the same relative position as the reference point of the first inductor network, to insure that variations in the condition sensed by the transducer are translated as electrical signal variations to the indicating sub-assembly.

3. For use with a system in which electrical energy is passed from a surface location to a down hole location over a cable including a plurality of conductors to energize equipment at the down hole location, the combination comprising:

a down hole assembly positioned at the down hole location, including a first balanced inductor network coupled to the conductors, and a transducer coupled between a reference point in the first inductor network and ground; and a surface assembly positioned at the surface location, including a second balanced inductor network coupled to the conductors, the inductors in the second network being disposed and connected in a configuration identical to that of the inductors in the first network, and an indicating sub-assembly including a meter coupled to a reference point in the second inductor network, the second reference point being located in the same relative position as the reference point of the first inductor network, and means for applying a unidirectional potential between ground and the meter to effect unidirectional current flow through a circuit including the transducer, the first and second balanced inductor networks, and the meter, to insure that variations in the condition sensed by the transducer are translated as electrical signal variations over the cable to the meter in the indicating sub-assembly.

4. A system as set forth in claim 3 and further comprising relay means, coupled to the meter, operable responsive to an indication of overheating at the down hole location to provide a signal to associated equipment connoting the overheated condition.

5. For use with a system in which electrical energy is passed from a surface location to a down hole location over a cable including a plurality of conductors to energize equipment at the down hole location, the combination comprising:
- a down hole assembly positioned at the down hole location, including a first balanced inductor network coupled to the conductors, and a transducer coupled between a reference point in the first inductor network and ground; and
- a surface assembly positioned at the surface location, including a second balanced inductor network coupled to the conductors, the inductors in the second network being disposed and connected in a configuration identical to that of the inductors in the first network, and an indicating sub-assembly including a meter coupled to a reference point in the second inductor network, the second reference point being located in the same relative position as the reference point of the first inductor network, means for applying a unidirectional potential between ground and the meter to effect unidirectional current flow through a circuit including the transducer, the first and second balanced inductor networks, and the meter, to insure that variations in the condition sensed by the transducer are translated as electrical signal variations over the cable to the meter in the indicating sub-assembly, and a standard resistance in the indicating sub-assembly, and switching means coupled to the meter, the switching means being operable in a first position to couple the meter to the standard resistance to zero the meter, and operable in a second position to couple the meter to the reference point in the second inductor network to provide an indication of variations in the characteristic sensed by the transducer.

6. For use with a system in which electrical energy is passed from a surface location to a down hole location over a cable including a plurality of conductors to energize equipment at the down hole location, the combination comprising:
- a down hole assembly positioned at the down hole location, including a first balanced inductor network coupled to the conductors, and a transducer coupled between a reference point in the first inductor network and ground; and
- a surface assembly positioned at the surface location, including a second balanced inductor network coupled to the conductors, the inductors in the second network being disposed and connected in a configuration identical to that of the inductors in the first network, and an indicating sub-assembly including a meter coupled to a reference point in the second inductor network, the second reference point being located in the same relative position as the reference point of the first inductor network, means for applying a unidirectional potential between ground and the meter to effect unidirectional current flow through a circuit including the transducer, the first and second balanced inductor networks, and the meter, to insure that variations in the condition sensed by the transducer are translated as electrical signal variations over the cable to the meter in the indicating sub-assembly, and switching means, coupled to the meter, operable in one position to pass a signal related to the meter reading to associated recording equipment, and operable in a second position to pass a calibration signal to the recording equipment, a reference conductor for passing a reference potential to the recording equipment, and conductor means for energizing the associated equipment.

References Cited
UNITED STATES PATENTS

| | | | |
|---|---|---|---|
| 2,937,527 | 5/1960 | Mason et al. | 340—18 X |
| 2,973,505 | 2/1961 | Johannesen | 340—18 |
| 3,024,658 | 3/1962 | Huddleston | 340—18 X |
| 3,068,447 | 12/1962 | Godbey | 340—18 |

BENJAMIN A. BORCHELT, *Primary Examiner.*

R. M. SKOLNIK, *Assistant Examiner.*